United States Patent
Sano

(10) Patent No.: US 6,271,274 B1
(45) Date of Patent: Aug. 7, 2001

(54) OPEN-CELL POLYISOCYANURATE FOAM FOR FIXING AND SUPPORTING PLANTS

(75) Inventor: Yoko Sano, Kofu (JP)

(73) Assignee: Toyo Quality One Corporation, Chuo-Ku (JP)

(*) Notice: Subject to any disclaimer, the term of this patent is extended or adjusted under 35 U.S.C. 154(b) by 0 days.

(21) Appl. No.: 09/297,511

(22) PCT Filed: Sep. 3, 1998

(86) PCT No.: PCT/JP98/03952

§ 371 Date: May 3, 1999

§ 102(e) Date: May 3, 1999

(87) PCT Pub. No.: WO99/11689

PCT Pub. Date: Mar. 11, 1999

(30) Foreign Application Priority Data

Sep. 3, 1997 (JP) ..................................... 9-276347
Dec. 26, 1997 (JP) ..................................... 9-370280
Jan. 21, 1998 (JP) ..................................... 10-042762

(51) Int. Cl.⁷ ..................................................... C08J 9/14
(52) U.S. Cl. .......................... 521/112; 521/114; 521/130; 521/131; 521/170; 521/172; 521/174
(58) Field of Search ................................. 521/170, 172, 521/174, 112, 130, 131, 114

(56) References Cited

U.S. PATENT DOCUMENTS 5,663,272 * 9/1997 Slack et al. ............................ 528/69

* cited by examiner

Primary Examiner—John M. Cooney, Jr.

(57) ABSTRACT

An open-cell polyisocyanurate foam for fixing and supporting plants, which is prepared from an aromatic isocyanate, a hydroxyl compound having an average number of functional groups of 1.0 or above and an oxyethylene content of 20 wt % or above, an isocyanuration catalyst and a silicone foam stabilizer consisting of a polysiloxyane/polyoxyalkylene copolymer wherein the terminal OH group of the polyether segment is capped with a compound not having any other active hydrogen atom and oxyethylene units are contained in an amount of 30 wt % or above, and which exhibits a density of 8 to 70 kg/m³, an open cell content of 98% or above, a hardness of 0.1 to 2.0 kgf/cm² in state compressed by 10 to 40% in both the parallel direction and the rectangular direction to the direction of expansion, and a hardness different by +20% to −20% from that found in a state compressed by 10% in both the parallel direction and the rectangular direction to the direction of expansion in a state compressed by 40% therein, is excellent in water absorption rate, water absorption capacity and water retention, and is improved in the reception of inserted flower.

31 Claims, 1 Drawing Sheet

OPEN-CELL POLYISOCYANURATE FOAM FOR FIXING AND SUPPORTING PLANTS

CROSS-REFERENCE TO RELATED APPLICATIONS

This application is the Section 371 entry into the United States, based on International Application PCT/JP98/03952, filed Sep. 3, 1998.

BACKGROUND OF THE INVENTION

1. Field of the Invention

The present invention relates to a supporter for a bud of plant, a tree and a cut flower or a supporter which is suited for growing of a plant, and more in detail relates to a polyisocyanurate foam having open-cell suited for a supporter to fix and support a plant which has an improved specific property.

2. Description of the Prior Art

It is well known that a polyurethane foam is used a supporter of plant. For instance, a hard type polyurethane foam is used as a supporter for a growing medium of plant such as a planted bud or a planted cutting and a cut flower, and a soft type polyurethane foam is used as a nursery sheet for growing a vegetable plant such as a leek, a lettuce or a spinach or a flower such as tulip.

The structural feature of the conventional soft type polyurethane foam is mainly composed by polyalkylene ether bond or polyester bond, which has an adequate elasticity and a hydrophilic and water absorption feature caused by ether bond and ester bond. However, said soft type polyurethane foam is too soft to support a tall plant such as a plant which bears fruit, such as a tomato, therefore is not on the market for a tomato plant. Further, since the soft type polyurethane foam has elasticity, it has a problem of difficulty to separate the root of plant from the foam when it is applied for example to the growing of a leek. Many trials to develop a hard type polyurethane foam of low elasticity having open cell and to use it as a nursery sheet for plants are carried out, whose open-cell can be broken with the growth of root and do not prevent the growth of plant root.

In general, the molecular weight of polyol which composes a hard type polyurethane foam is smaller than that of polyol which composes a soft type polyurethane. Further, since the hard type polyurethane foam has a multi-functional property, the reactivity with isocyanates is very rich and easily forms closed cell, therefore, it is very difficult to prepare a hard type foam which has open cell. For the preparation of a hard type polyurethane foam for a nursery sheet, it is necessary to form open cell to improve water absorption and water holding ability. These prior arts are disclosed in Japanese Patent Laid-open publication 46-741, Japanese Patent Laid-open publication 48-25098, Japanese Patent Laid-open publication 49-63796, Japanese Patent Laid-open publication 49-97897, Japanese Patent Laid-open publication 2-14209 and Japanese Patent Laid-open publication 2-212511.

In the document of Japanese Patent Laid-open publication 46-741, polyol whose molecular weight is smaller than 500 and polyol of high molecular weight whose molecular weight is 500 to 5000 are used a polyol, isocyanate index is restricted to 20 to 80, the reactivity difference of polyol and isocyanate index is set up at low level of 20 to 80, an open-cell structure is obtained by preventing the bridging reaction and a hydrophilic feature is achieved by matching OH group remaining in view of the low isocyanate index.

However, referring to the foam obtained by said method, proportion of open-cell is low, and so the water absorption is low level of 51 to 75%. Further, there remains elasticity caused by lack of bridging bonds and hard segments. That is, since the obtained foam has problems of lack of hardness and when it is used to support a planted bud or a planted cutting or a cut flower, it is very hard to be inserted. This problem is remarkable for a flower of slender stalk such as a baby's breathe or a flower of soft and thick stalk such as a gerbera.

Japanese Patent Laid-open publication 48-25098, discloses a technique to prepare a hydrophilic foam with open-cell. Tertiary amine polyol which are initiated by amine compound is used as a part of polyol to utilize the reactivity difference of polyols and isocyanate index is restricted to lower level of 50 to 90 similarly to Japanese Patent Laid-open publication 46-741. However, the proportion of open-cell is low and so the water absorption is low. Therefore, the problems of elasticity caused by lack of bridging bonds and hard segments remains, and as a result it has a similar problem of lack of hardness; consequently it is very hard to insert a flower of slender stalk or a flower of soft and thick stalk.

Japanese Laid-open publication 49-63796, disclose a method to prepare a compressed foam which restores to its original size by water swelling. This method uses a low molecular weight polyol and a specific modified low reactive aliphatic isocyanate compound. However, the proportion of open-cell of the obtained foam is low, and the foam has an elastic feature caused by isocyanate compound which is used as a starting material, and has a similar problem, that is, a lack of hardness, consequently the foam is very hard to insert a flower of slender stalk or a flower of soft and thick stalk.

Japanese Patent Laid-open publication 49-97897, discloses a foam prepared using a tertiary amine polyol, a polyol which does not possess tertiary amino group and an emulsifier under the condition of especially low isocyanate index of 55 to 70%.

This foam also utilizes the reactivity difference of polyols and low isocyanate index to form an open-cell, however, elasticity caused by a lack of bridging bonds and hard segments remain, and it has a similar problem which includes lack of hardness, consequently, it is very hard to insert a flower of slender stalk or a flower of soft and thick stalk.

The foam disclosed in the document of Japanese Patent Laid-open publication 2-14209 is a foam which is prepared by using a specific amine polyol and a monoalkylylether polyol of polyethylene glycol and restricting the isocyanate index to the limits of 25 to 90%. This foam is also combining the reactivity difference of polyols, lower bridging bonds proportion by mono-ol and lower bridging bonds proportion by isocyanate index. Therefore, this foam has similar problems to formerly mentioned foams, namely lack of open-cell, elasticity and lack of hardness.

The foam disclosed in the document of Japanese Patent Laid-open publication 2-212511 uses as least two kinds of polyol and prepares an open-cell foam under the presence of acid, however, the proportion of open-cell is low and consequently the water absorption is not so high. Further, the obtained foam lacks hard segments and has an elasticity. Namely it lacks hardness and has a similar problem, consequently, it is very hard to insert a flower of slender stalk or a flower of soft and thick stalk.

As mentioned above, the proportion of open-cell of conventional foam for fixing and supporting plant is low and has appropriate elasticity. Therefore, although the hydrophilicity of the foam is sufficient, the water absorption is low, and the foam is extended when the plant is inserted. That is, the inserting of plant is not uniform buckling against uniform pressure, and concretely it is very difficult to insert a plant of soft stalk.

As clearly understood from the documents mentioned above, since the conventional hard type polyurethane foams of hydrophilic open-cell have a problem of lack of water absorbency and lack of easily inserting, it is not practically applied as a supporter for cut flower, and so the usage of it is restricted in a nursery sheet for a rice plant and a spinach. The market of the supporter for cut flower is almost fully occupied by a phenol foam which has a good easily inserting property. Further, the conventional hydrophilic hard type open-cell polyurethane foam have problems of lack of water absorbency and prevention of root growth, the current market is mainly occupied by a phenol foam or a rock wool.

Concerning the above mentioned problems which conventional hard type polyurethane foam, an object of this invention is to provide a hard type open-cell foam which is good at water absorbing rate and capacity, and a good easily inserting ability for a flower of slender stalk or a flower of soft and thick stalk, further have a fixing and supporting ability. Furthermore, another object of this invention is to provide a hard type open-cell foam which has a good ability to support a plant, can easily be broken along with the growth of a plant root and can easily be broken after use, and further has a good water absorbing ability and a big water holding capacity.

Since the conventional foam used in this field is prepared by utilizing the reactivity difference of polyols and lower isocyanate index, the foam of uniform and perfect open-cell can not be obtained, and the residue of independent cells generates buoyancy and prevents the foam from sinking into water, consequently causes a lack of water absorbing capacity. And, since the foam lacks of bridging bonds and hard segments because of lower isocyanate index, it remains elastic, lacks hardness and ease of breaking and has a problem of being difficult for inserting of a flower of slender stalk or a flower of soft and thick stalk. Therefore, still another object of this invention is to solve above-mentioned problems, further, to provide a foam for fixing and supporting a plant which does not use a fulon type foaming agent and an organic solvent different from the preparation method of a phenol foam.

Furthermore, since the phenol foam is foamed and hardened by acid catalyst, pH value is low and is not suited as the supporter for a cut flower, a planted cutting or a planted bud. To avoid said problem, it is necessary to wash the foam by fresh water before actual use. This procedure is called "removing harshness", and if this "removing harshness" procedure is abbreviated, the life of a cut flower becomes very short.

This invention provides a foam for fixing and supporting a plant which does not need a washing procedure by water.

DISCLOSURE OF THE INVENTION

This invention provides a hard type polyisocyanurate foam having an open-cell structure, and is useful for a supporter to fix and support a plant. The invention foam is prepared using a polyisocyanate compound, a hydroxy compound, a pore foaming agent comprising water and/or other agents, a catalyst, a silicone foam stabilizer, a neutral emulsifier which does not have an activated hydrogen and, optionally, an ionized emulsifier, as starting materials wherein, 1) a polyisocyanate compound is an aromatic polyisocyanate compound,
2) a hydroxy compound is a hydroxy compound whose average number of functional groups is bigger than 1.0 and contents of oxyethylene is bigger than 20% by weight,
3) a catalyst is at least an isocyanurate type catalyst and
4) a silicone foam stabilizer is a polysiloxane-polyoxyalkylene copolymer whose polyoxyalkylene polyether end OH group is capped by other compound which does not include active hydrogen atom, further, said polyoxyalkylene contains more than 30 weight % of oxyethylene, and is used at the pore formation process, further, the structural features of said foam include,
5) 8 to 70 kg/m³ specific gravity,
6) higher than 98% open-cell ratio and
7) 40% compressive hardness to the parallel direction to the foam rising direction is 0.1 to 2.0 kgf/cm².

BRIEF DESCRIPTION OF THE DRAWINGS

The attached figure is a graph showing the relationship between compressive ratio and load which regulates the compressive hardness of the foam of this invention.

DETAIL DESCRIPTION OF THE INVENTION

Figure 1:
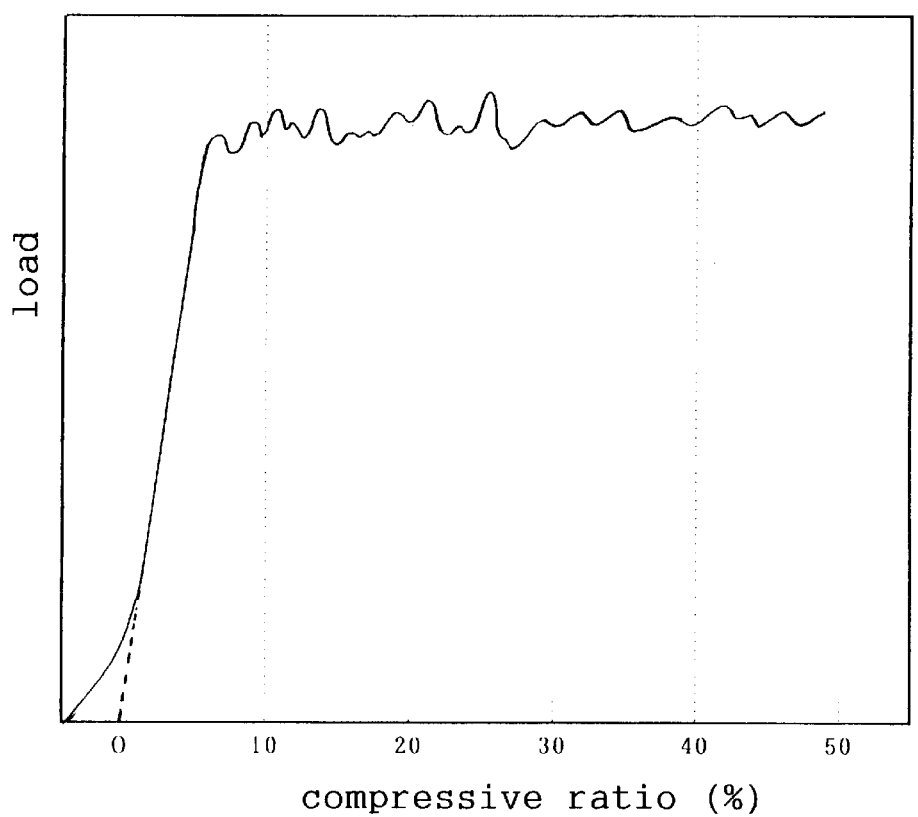

In the present invention, the term "supporter to fix and support a plant" includes a supporter for a growing medium such as planted bud or planted cutting, a support for fixing and supporting a cut flower, a planted cutting and/or flowers while they are transported and a nursery sheet of a plant. A "supporter for plant transporting" is a support in which many plants are inserted with water supply.

Especially, in a case of a supporter of growing plant medium such as a planted bud or a planted cutting, cut flower transporting supporter, the open-cell isocyanurate foam of 13 to 70 kg/m³ specific gravity is desirable used as the supporter for fixing and supporting of a plant. 10% or 40% compressive hardness of parallel and cross direction to foam rising direction of said isocyanurate foam is in the range of 0.2 to 1.5 kgf/cm², further, 40% compressive hardness parallel to the foam rising direction is within the region of plus 20% to minus 20% of 10% compressive hardness parallel to the foam rising direction, and 40% compressive hardness cross to the foam rising direction is within the region of plus 20% to minus 20% of 10% compressive hardness cross to the foam rising direction. Preferably, an open-cell foam of 8 to 70 kg/m³ specific gravity, having 0.1 to 2.0 kgf/cm² hardness to 40% compressed to parallel direction to pore forming direction is desirably used as the polyisocyanurate foam for the supporter of polyurethane foam for a nursery sheet.

As the aromatic polyisocyanate used in this invention, the can be mentioned, for example, polymethylenepolyphenylenepolyisocyanate,
4,4=diphenylmethandiisocyanate,
crude polymethylenepolyphenylenepolyisocyanate,
2,4'-diphenylmethandiisocyanate,
2,2'-diphenylmethandiisocyanate,
2,4-trylenediisocynate
2,6-trylenediisocyanate
1,5-naphthalenediisocyanate.

In the present invention, polyisocyanate is restricted to aromatic polyisocyanate, because the "easily inserting" of plant is a necessary feature of a plant fixing and supporting foam. That is, if an aliphatic or alicyclic polyisocyanate is used, an obtained foam has an elasticity with elongation and lack of buckling property, therefore, it is not easy to insert a plant in the foam.

Among these mentioned polyisocyanate, especially,
polymethylenepolyphenylenepolyisocyanate,
4,4'-diphenylmethandiisocyanate and
crude polymethylenepolyphenylenepolyisocyanate (crude MDI)

can be preferably used because these compounds decrease the elongation of foam and provides good hardness to the foam.

These polyisocyanates can be used alone or by adding carbodiimide denatured and/or urethane denatured and/or urea denatured and/or allophanate denatured and/or isocyanurate denatured ones.

As a hydroxy compound used in this invention, the hydroxy compound whose average number of functional groups is bigger than 1.0 and contents of oxyethylene is bigger than 20% by weight, and a hydroxy compound whose average number of functional groups is 1.0 to 5.0 and number-average molecular weight is smaller than 20000 is preferably used. Especially, more preferable hydroxy compound is a hydroxyl compound whose average number of functional groups is 1.0 to 3.5, number-average molecular weight is 500 to 10000 and contents of oxyethylene is 50 to 90% by weight. When the content of oxyethylene is bigger than 90 wt %, the hydroxy compound has a tendency to crystallize at the room temperature and is not easy to be handled.

As an example of hydroxy compound which can be used in this invention, polyethers which are prepared by addition polymerization of alkylene oxide such as ethyleneoxide or propyleneoxide with monohydric or polyhydric alcohol, amine compound containing hydroxyl group, polyhydric amino compound, organic carboxylic acid or alkyl phenol can be mentioned. And as the substantial example, compounds obtained by addition polymerization of alkylene oxide e.g. ethyleneoxide to methanol, ethanol, propanol, ethyleneglycol, propyleneglycol, diethyleneglycol, stearyl alcohol, oleyl alcohol, cetyl alcohol, allyl alcohol, glycerin, trimethololpropane, pentaerythritol, sorbitol, monoethanolamine, diethanolamine, triethanolamine, ethylenediamine, tolylenediamine, oleic acid, stearic acid or alkylphenol can be mentioned. Further, a hydroxy compound of low molecular weight such as low molecular weight polyol, e.g. glycerin, trimethylolpropane, diethyleneglycol or polypropyleneglycol can be used, and in the case, it is desirable to mix and blend so that the content of oxyethylene is bigger than 20% by weight.

If the contents of oxyethylene is smaller than 20 wt % of hydroxy compound, a foam which has perfect open-cell having normal physical property can not be obtained, further, the hydrophilicity of the foam is deteriorated.

As the isocyanurate catalyst, a conventional well-known isocyanurate catalyst can be used in this invention.

For instance, quaternary ammonium salt, organic acid alkali metal salt, metallic salt of strong base and alcoholate can be mentioned. And as a substantial compound, potassium acetate, sodium acetate, potassium octylate, sodium octylate, potassium hydroxy, hexadhyro-S-triazine, potassium alcoholate and others can be mentioned. Further, catalyst for polyurethane such as tertiary amine and organic metal catalyst can be used together with these isocyanurate catalysts.

Further, desirably, isocyanate index of the catalyst is bigger than 110.

The kind of a neutral emulsifier which does not have an activated hydrogen atom of this invention is not especially restricted, however, a compound which has the following structural feature is desirably used, that is, the compound of polyoxyethylene polyol whose end is capped with the compound which does not have active hydrogen atom. As the concrete example, the compound whose end is capped with di-functional glycol such as polyethyleneglycol or polypropylene glycol or poly-functional compound containing hydric group such as glycerine or trimethylolpropane is added with ethyleneoxide or propyleneoxide or said end of poly-functional polyol capped with the compound which does not have active hydrogen atom is desirably used. For instance, a compound whose end is capped with an organic acid, e.g. oleic acid ester group, a compound whose end is capped with an alkoxy group or an acetoxy group or a compound whose end is capped with both said organic acid ester group and said alkoxy group. Further, a compound having a structural feature that the OH end group of a compound prepared by addition polymerization of methanol or alkylphenol with alkylene oxide is capped with alkoxy group or organic ester group can be desirably used, and more desirably an esterified compound of fatty acid can be used.

That is, a neutral emulsifier used in this invention which does not have activated hydrogen atom is a compound which has a polyoxyalkylene chain, and whose end does not have OH group. For example a compound of monoisocyanate, diisocyanate or monoalcohol which is capped with urethane bond can be mentioned.

Referring to the oxyalkylene chain of a neutral emulsifier which does not have an activated hydrogen used in this invention, the effect to form an open-cell foam structure becomes better along with the increase of polyoxyethylene proportion, and also the hydrophilic feature and water holding capacity becomes better, however, it depends on a kind of polyol and silicone as foam stabilizer. The proportion of oxyethylene chain contained in polyoxyalkylene chain is desirably bigger than 20 wt % to total molecular weight, and more desirably bigger than 50 wt %. The length of polyoxyalkylene chain and the containing proportion of oxyethylene chain can be voluntarily decided according to the kind of polyether, silicone as foam stabilizer and isocyanate.

As the example of said compound, there can be mentioned, diester of polyethyleneglycol linolenic acid,
diester of polyethyleneglycol linoleic acid,
diester of polyethyleneglycol thriallol acid,
ethyleneoxide adduct of glycerin oleic acid triester
polyethyleneglycol oleic lauric acid diester
polyethyleneglycol stearic acid diester
polyethyleneglycol lauric acid diester
polyethyleneglycol oleic acid diester
methylpolyethyleneglycol stearic acid ester
dimethylpolyethyleneglycol
polyethylenepolypropyleneglycol stearic acid diester and
dimethylpolyethylenepolypropyleneglycol.

When these polyalkyleneglycol ester or methoxy polyalkyleneglycol are used on an industrial scale, since the pure chemicals can not be used, small amount of esters or fatty acids which possess OH group are mixed as an impurity. However, these materials can be used if the amount of impurities are not so big.

Esters which have OH group do not deteriorate the function of the emulsifier so remarkably. Meanwhile, since a fatty acid not only substantially increases the hydrophobic tendency of the product, but also forms independent cells, it can not be desirably used. Desirably these compounds can be used in the limit of smaller than 20 acid value, more desirably smaller than 10 acid value.

It is desirable to use the neutral emulsifier by 2 to 35 wt % to the total weight of total mixture, and 10 to 200 weight part of polyol to 100 part of polyol of the reactive mixture, more desirably 40 to 150 weight part of polyol to 100 part of polyol of the reactive mixture.

The chemical structure of typical neutral emulsifier which does not have activated hydrogen is indicated as follows.
(1) polyethyleneglycol oleci acid diester

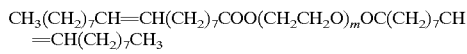

wherein "m" is an integer number.
(2) methylpolyethyleneglycol stearic acid ester

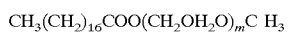

wherein "m" is an integer number.
(3) polyethylenepolypropyleneglycol lauric acid diester

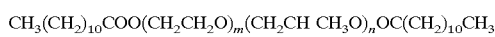

wherein "m" and "n" are each integer number.

The silicone foam stabilizer used in this invention is a copolymer of polysiloxane-polyoxyalkylene, and it is necessary that the OH end group of polyoxyalkylene is capped with other compound which does not have activated hydrogen atom. As a desirable example, the capped structure is selected from at least one of alkoxy group of $C_1$–$C_4$, acetoxy group or aliphatic acyloxy group, and more desirably alkoxy group of $C_1$–$C_4$ and acetoxy group, can be mentioned. And the contents of oxyethylene chain is desirably bigger than 30 wt % to the total weight of oxyalkylene chain.

The typical chemical structure of copolymer of polysiloxane-polyoxyalkylene is shown by the following chemical formula [1].

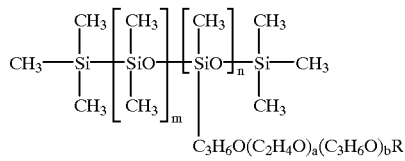

[1]

(in this formula, R represents H, $CH_3$, $C_2H_5$, $CH_3CO$, m is an integer bigger than 8, n is an integer bigger than 1, a is an integer bigger than 4 and b is an integer bigger than 1).

The desirable n/m ratio is 1/5 to 1/60, and more desirable ratio is 1/7 to 1/30.

Along with the increase of proportion of oxyethylene to the total weight of polyoxyalkylene in the copolymer of polysiloxane-polyoxyalkylene, open-cell proportion in obtained foam becomes bigger, and also hydrophilicity and water holding capacity of the foam is improved.

The desirable proportion of oxyethylene to the total weight of polyoxyalkylene is from 50 wt % to 90 wt %, and more desirable proportion is from 70 wt % to 90 wt %.

When the proportion of oxyethylene is bigger than 90 wt %, the state of polysiloxane-polyoxyalkylene is solid and very had to handle and the water absorbing rate becomes slower.

When the proportion of oxyethylene becomes smaller than 50 wt %, the preparation of open-cell of 100% becomes difficult, and the water absorbing and water holding capacity, as well as stability of foam cell decreases. And if polyoxyalkylene end of polysiloxane-polyoxyalkylene is OH group, the water absorbing speed is remarkably deteriorated. If it is necessary to introduce polyoxyalkylene end OH group, it must be smaller than 25% to the total number of groups of alkoxy group, acetoxy group and aliphatic acyloxy group. Along with the increase of OH group, the foam becomes more hydrophobic. Further, polysiloxane-polyoxyalkylene copolymer which has OH group can be used together with a silicone type emulsifier of this invention, however, the foam becomes more hydrophobic. The method may also be practical using a silicone type emulsifier which has OH groups in amounts which do not spoil the special feature of foam covered by this invention.

The desirable amount of this silicone as foam stabilizer is 0.5 to 6.0 parts to 100 part of polyether.

As the ionized emulsifier which may optionally be used in this invention, anionic type, cationic type or amphoteric type can be used, however the anionic type, for instance
sodium dodecylbenzenesulphonic acid,
sodium dialkylsulphosuccinic acid or
sodium alkyldiphenyletherdisulphonic acid
can be preferably used.

Since said ionized emulsifier synergizes with the neutral emulsifier which does not have an activated hydrogen, and acts as a subsidiary for open-cell forming agent and foam stability improves a water holding and water absorbing ability, it is desirable to be used together with the neutral emulsifier.

The ionized emulsifier is generally desirable to be used within the range of 1 to 10 wt % to the total amount of whole reaction mixture.

The density of polyisocyanurate foam of this invention is necessary to be in the range of 8 to 70 kg/m$^3$. When the density is smaller than 8 kg/m$^3$, the supporting ability for plants and water holding capacity deteriorates. And, when the density is bigger than 70 kg/m$^3$, the water absorbing ability becomes too low. The desirable region of specific gravity of polyisocyanurate foam for supporting a cut flower, a planted cutting and a flower at transportation is 13 to 70 kg/m$^3$, more desirably 18 to 35 kg/m$^3$, and for a nursery sheet, the desirable range of specific gravity is 8 to 70 kg/m$^3$, more desirably 13 to 35 kg/m$^3$.

The proportion of open-cell of isocyanurate foam of this invention is bigger than 98%. Said proportion of open-cell is measured according to ASTM D2856-70 procedure B.

When the proportion of open-cell is smaller than 98%, the proportion of independent cell of over 2% gives buoyancy to the foam as to float on the water surface, and needs several hours until full water absorption. And even if the foam is wetted, water does not enter into the closed cell, and therefore the water absorbing capacity is small.

When the proportion of open-cell is bigger than 98%, water penetrates easily into foam without using weight, and it can be sank perfectly under the water surface.

Especially, when the proportion of open-cell becomes 100%, it can be sank under the water surface in seconds to several 10 seconds, it is more desirable.

In the present invention, a polyisocyanurate foam used for fixing and supporting of a cut flower, a planted cutting and a flower at transportation has an irreversible compressive feature. When the compression ratio is in 10 to 40%, the compressive hardness parallel and cross to the foam rising direction are in the range of 0.2 to 1.5 kgf/cm$^2$, further the 40% compressive hardness parallel to the foam rising direction is in the range of plus 20% to minus 20% of the 10% compressive hardness parallel to the foam rising direction, and desirably in the plus 10% range. Further, 40% compressive hardness cross to the foam rising direction is within the region of plus 20% to minus 20% of 10% compressive hardness cross to the foam rising direction, desirably within plus 10%. When the compressive hardness is smaller than 0.2 kgf/cm$^2$, the fixing and supporting force is too small for practical use. And when it is bigger than 1.5 kgf/cm$^2$, a plant of slender stalk or soft plant can not be inserted.

Further, when the 40% compressive hardness is bigger than 20% of the 10% compressive hardness, it is too hard to insert. That is, a hard type foam which does not have a buckling area has a bigger elongation, and 40% compressive hardness of it is more than 20% bigger than that of 10% compressive hardness, so a plant can not be inserted to the foam with buckling sharply and easily.

40% compressed hardness parallel to the foam rising direction of isocyanurate foam of this invention for a nursery sheet is in the range of 0.1 to 2.0 kgf/cm$^2$. When mentioned hardness is smaller than 0.1 kgf/cm$^2$, the supporting power for a plant is too small to be practically used, and when it is bigger than 2.0 kgf/cm$^2$, it does not give a good influence to the growing of root. The desirable region is 0.1 to 1.5 kgf/cm$^2$.

Pressed hardness of the foams of this invention is the value obtained by measuring a specimen of 30 mm×30 mm×20 thickness at 5 mm/min rate. Said hardness is measured by ASTM D1621-73, in which the initial (zero) point of compressive ratio is regulated as shown in the appended figure. And other measuring conditions are also set up according to ASTM D 1621-73.

The proportion of open-cell of isocyanurate foam of this invention is bigger than 98%, and desirably the poromeric ability measured by JIS K6400 procedure A poromeric method is bigger than 5 ml/cm$^2$/sec. Accordingly, water absorbing rate becomes fast, and also water absorbing rate becomes big and is suited for the cultivation of plant. The most desirable range for the permeability is bigger than 10.0 ml/cm$^2$/sec. Above mentioned values are measured on 10 mm thickness foam.

As the pore forming agent, just water can be used, however, a liquid of low boiling point for instance, pentane, hexane, dichloromethane, 1,1-dichloro-1-fluoroethane can be preferably used at need.

The polyisocyanurate foam having open-cell for a plant fixing and supporting of this invention can be formed only by H$_2$O pore forming agent, and is not a foam formed using fulon type pore foaming agent such as phenol foam. Therefore, it does not cause an environmental pollution as is caused by fulon type chemicals.

In this invention, conventional and well-known additives and fillers can be added. For example, an inorganic filler such as calcium sulfate or barium sulfate, an organic filler such as water absorbing resin, a pigment, an anti oxidation agent and an anti ultraviolet agent, can be included in the open-cell polyisocyanurate foam.

Many kinds of polyisocyanurate foam having open-cell for a plant supporter or a nursery sheet have already been proposed. However, for the purpose to obtain an open-cell and a good hydrophilicity, these proposals mainly use glycerin, low molecular weight polyol such as triethanol amine, amine type polyol and high molecular weight polyol, and utilizes a reactivity difference between polyols and low isocyanate index. However, in a case of these hard type isocyanate foam, it is difficult to raise the proportion of open-cell to over than 95% level, and further, since OH groups residue of polyol remain in foam, the proportion of bridging bonds in foam is low and the foam lacks of hard segments. That is, the obtained foam is a hard foam with an elasticity.

Therefore, the obtained hard urethane foam can easily float on water and does not absorb water easily by buoyancy generated by closed cell remaining in foam, which also prevents the growth of a plant root. Further, these foams have a problem that the pores are easily broken along with the growth of a plant root caused by lack of bridging bonds and hard segments. Meanwhile, a soft type urethane foam is not sufficient at the supporting power for a plant, therefore, the market is almost occupied by a phenol foam in a cut flower market and by a rock wool in a planted cutting market.

The present invention is made to solve the above mentioned problems, and the object of this invention is to provide a foam which has following strong points. That is, the foam can easily absorb a large amount of water instantly and can hold it, has a good inserting feature similar to a phenol foam, and as the nursery sheet, by means of perfect open-cell and hardening to prevent the elongation of foam, it supports plant and does not prevent the growth of root and can be easily removed from the plant after the harvest.

The present invention is accomplished by a constant effort of the inventor and by way of quite different method from the conventional way for the development.

That is, in a conventional urethane foam, it is obvious that to obtain almost 100% proportion of open-cell by the reactivity difference between low molecular weight polyol and high molecular weight polyol, the reactivity difference between amine type polyol and other than amine type polyol and by controlling gel forming reaction using low isocyanate index is difficult. Furthermore, the conventional urethane foam is inferior in supporting power of plant, growth of root and removal from the plant after harvest because of the lack of bridging bonds and hard segments.

The present invention has solved the above mentioned problems, that is, supporting power of plant and removal from the plant after harvest. And especially, accomplished the technique to provide a foam with an open-cell structure and a hydrophilicity on polyisocyanurate foam.

That is, the present invention has solved the problem which conventional foam for a nursery sheet have, by [1] aromatic polyisocyanate, [2] hydroxy compound whose oxyethylene contents is bigger than 20%, [3] silicone as foam stabilizer is a polysiloxane-polyoxyalkylene copolymer whose oxyalkylene end is capped with an alkoxy group and/or lower aliphatic acyloxy group and/or an acetoxy group, further oxyethylene chain contents in polyoxyalkylene chain is bigger than 30 wt %, [4] a neutral emulsifier which does not have an activated hydrogen, [5] a pore forming agent and, optionally [6] an ionized emulsifier, and accomplished a foam for a plant fixing and supporting.

Especially the present invention is a foam which has accomplished 100% open-cell, hydrophilicity, supporting power, inserting ability and removal after harvest by the synergism effect by hydroxy compound whose oxyethylene contents is bigger than 20 wt %, a polysiloxane-polyoxyalkylene copolymer whose graft oxyalkylene end is capped by alkoxy group and a neutral emulsifer. A neutral emulsifer which does not have an activated hydrogen acts to control and to stabilize the foaming reaction and gelling reaction, and acts as an open-cell forming agent. By the conventional method using polyols whose reactivity are different, it is difficult to obtain a 100% open-cell structure even if health bubbles are generated, on the contrary, the present invention has accomplish the hydrophilic isocyanurate foam with perfect open-cell structure. It is quite epoch-making matter to develop a foam of this invention by improving a hydrophobic isocyanurate foam.

This is not caused by the reactivity difference of polyol. The neutral emulsifier which does not have an activated hydrogen is solved in hydroxy compound which has oxyethylene chain by specific concentration, and the solubility to polymer deteriorates at the end of pore foaming and gelling reaction as to separate in very small size, then the portion of small viscoelasticity forms open-cell structure by generated $CO_2$ gas.

That is, the neutral emulsifier which does not have an activated hydrogen does not only make an obtained foam by hydrophilic, but acts as an open-cell forming agent. These functions are composed by the synergism effect by specific polyol, specific silicone as foam stabilizer and neutral emulsifier which does not have an activated hydrogen.

That is, in the case of open-cell forming method by hydroxy compound having more than 20% oxyethylene chain and silicone as foam stabilizer whose oxyethylene proportion is large, it is difficult to form a foam with fine open-cell of 100% open-cell proportion without a neutral emulsifier which does not have an activated hydrogen.

In general, a polyurethane foam is prepared by the effect of silicone surfactant agent so as to possesses uniform independent cell or open-cell, however, the method of this invention is out of conventional mechanism.

When the neutral emulsifier is removed from the recipe of this invention, the foam becomes very unstable and forms big cells. When the neutral emulsifier which does not have an activated hydrogen is used, the pore formation process becomes very stable and a foam of fine cells can be obtained.

The hydrophilic feature of hydrophobic polyisocyanurate foam is caused by a specific silicone as foam stabilizer and a neutral emulsifier which does not have an activated hydrogen.

It is presumed that to the rib surface of the obtained foam, specific silicone as foam stabilizer and a neutral emulsifier are oozed out and make a surface hydrophilic, and the molecule of these specific silicone foam stabilizers are lined up at the rib surface of the foam so the hydrophilic alkoxy groups are faced to the surface.

In the present invention, whether the oxyalkylene end of a polysiloxane-polyalkylene copolymer is capped by alkoxy group or not, gives very big difference to water-absorbing ability of the foam.

In Table 1, the difference of water absorbing ability between foams whose polyalkylene end of a polysiloxane-polyalkylene copolymer is OH group, is masked by acetoxy group and methoxy group. Foam recipe and other features are also summarized in Table 1. That is, R of chemical formula [1] is H, $CH_3CO$ or $CH_3$.

TABLE 1

|  | material/experimental No. | 1 | 2 | 3 |
|---|---|---|---|---|
| blending recipe | Polyol-1 | 100 | 100 | 100 |
|  | $H_2O$ | 3.5 | 3.5 | 3.5 |
|  | Polycat 46 | 0.5 | 0.4 | 0.4 |
|  | Polycat 42 | 1.8 | 1.8 | 1.8 |
|  | Si. as foam stabilizer-1 | 3.0 | 0 | 0 |
|  | Si. as foam stabilizer-2 | 0 | 3.0 | 0 |
|  | Si. as foam stabilizer-3 | 0 | 0 | 3.0 |
|  | Ionet DO-600 | 100 | 100 | 100 |
|  | Sanmorin OT-70N | 20 | 20 | 20 |
|  | $CaCO_3$ | 20 | 20 | 20 |
|  | Coronate 1110 | 200 | 200 | 200 |
| physical property | specific gravity (g/cm$^3$) | 0.034 | 0.033 | 0.035 |
|  | 10% comp. Hardness (cross) | 0.37 | 0.36 | 0.35 |
|  | 40% comp. Hardness (cross) | 0.37 | 0.35 | 0.37 |

TABLE 1-continued

| material/experimental No. | 1 | 2 | 3 |
|---|---|---|---|
| open-cell ratio | 98 | 98 | 99 |
| water absorption speed | 90 min | 1 sec | 2 sec |

Polyol-1:
Primary alcohol of OH value 42.0 obtained by addition polymerization of ethyleneoxide/propyleneoxide by 75/25 to stearic alcohol.

Polycat 46:
Ethylene glycol solution of potassium acetate (product of Japan Emulsifier Co., Ltd.)

Polycat 42:
Mixture of potassium 2-ethylenehexane and N,N$^{1'}$,N"-tri (dimethyl amino propyl) hexahydro-s-triazine (product of Japan Emulsifier Co., Ltd.)

Silicone as foam stabilizer-1:
Polysiloxane-polyalkylene copolymer, polymerization degree dimethylsiloxane is 30 (m of chemical formula [1] is 30), polymerization degree of polyoxyalkylene graft methylsiloxane is 3(n of chemical formula [1] is 3), oxyethylene in polyoxyalkylene is 75 wt % and others is oxypropylene and oxyalkylene end is OH group.

Silicone as foam stabilizer-2:
Polysiloxane-polyalkylene copolymer, polymerization degree of dimethyl siloxane is 30 (m of chemical formula [1] is 30), polymerization degree of polyoxyalkylene graft methylsiloxane is 3 (n of chemical formula [1] is 3), oxyethylene is polyoxyalkylene is 75 wt % and others is oxypropylene and oxyalkylene end is methoxy group.

Silicone as foam stabilizer-3:
Polysiloxane-polyalkylene copolymer, polymerization degree of dimethyl siloxane is 30 (m of chemical formula [1] is 30), polymerization degree of polyoxyalkylene graft methylsiloxane is 3 (n of chemical formula [1] is 3), oxyethylene in polyoxyalkylene is 75 wt % and others is oxypropylene and the oxyethylene end is acetyl group.

Ionet DO-600:
Oleic acid diester of polyethylene glycol (product of Sanyo Chemical Co., Ltd.).

Sanmorin OT-70N:
Solution of sodium dictylsulfo-succinate (product of Sanyo Chemical Co., Ltd.).

Corronate 110:
Crude MDI, NCO 31.6% (product of Nippon Polyurethane Industries, Co., Ltd.).

10% compressed hardness:
Specimen of 30 mm×30 mm×20 mm thickness is compressed parallel to the foam rising direction of 5 mm/min rate and hardness at 10% compressed point is measured.

40% compressed hardness:
Specimen of 30 mm×30 mm×20 mm thickness is compressed parallel to the foam rising direction by 5 mm/min rate and hardness at 40% compressed point is measured.

Open-cell proportion:
Measured by ASTM-D-2856-70.

Water absorption rate:
One drop of pure water is dripped by a syringe with needle (needle standard 22G×1.25": product of Nipro Co., Ltd.) on the specimen and the rate that the drop is absorbed into the specimen is measured.

As clearly understood from Table 1, density, compressed hardness and open-cell proportion of polysiloxane-polyalkylene copolymer whose oxyalkylene end is capped with OH group, acetoxy group or methoxy group are almost same, however, the water absorption rate are remarkably different. Although the reason for this phenomena can not be clearly explained, it is believed to be caused by a synergism of a specific silicone which does not have OH group, a specific neutral emulsifier which does not have an activated hydrogen and a specific polyol containing ethylene oxide, and said water absorbing effect can not be generated without a neutral emulsifier which does not have an activated hydrogen. As mentioned, a polyisocyanurate foam which absorbs water instantly can be developed, consequently, a polyisocyanurate foam of open-cell for a plant fixing and supporting can be developed.

The polyisocyanurate foam having open-cell for a nursery sheet of this invention possess not only isocyanurate bond but also polyurethane bond and urea bond and the microorganism decomposition property is remarkably big. In comparison with a phenol foam or rock wood which can not be decomposed by microorganism, the foam of this invention can be said to be as a good product, but which is gentle to the environment because it decomposes naturally when it is left in nature. Especially, derivatives of oxyalkylene glycol promotes the microorganism decomposition.

EXAMPLES AND COMPARATIVE EXAMPLES

The present invention is illustrated in more detail by attached Examples and Comparative Examples.

Example 1

Polyisocyanurate foam is prepared by reacting polyetherpolyol (polyol-2) of about 3000 molecular weight which is produced by random addition reaction of ethylene oxide and propylene oxide to glycerin by 80/20 weight proportion, crude polymethylene polyphenylene polyisocyanate, neutral emulsifier and anionic emulsifier.

Recipe of starting materials and characteristics of obtained foams are summarized in Table 2.

Example 2

Polyisocyanurate foam is prepared by reacting polyetherpolyol (polyol-3) of about 2000 molecular weight which is produced by random addition reaction of ethylene oxide and propylene oxide to glycerin by 80/20 weight proportion, crude polymethylene polyphenylene polyisocyanate, neutral emulsifier which does not have an activated hydrogen and anionic emulsifier.

Recipe of starting materials and characteristics of obtained foams are summarized in Table 2.

Example 3

Polyisocyanurate foam is prepared by reacting polyetherdiol (polyol-4) of 5.61 OH value which is produced by random addition reaction of ethylene oxide and propylene oxide by 80/20 weight proportion, crude polymethylenepolyphenylene-polyisocyanate, neutral emulsifier which does not have an activated hydrogen and anionic emulsifier.

Recipe of starting materials and characteristics of obtained foams are summarized in Table 2.

TABLE 2

|  | material/experimental No. | Exmp. 1 | Exmp. 2 | Exmp. 3 |
|---|---|---|---|---|
| recipe | Polyol-2 | 100 | 0 | 0 |
|  | Polyol-3 | 0 | 100 | 0 |

TABLE 2-continued

|  | material/experimental No. | Exmp. 1 | Exmp. 2 | Exmp. 3 |
|---|---|---|---|---|
|  | Polyol-4 | 0 | 0 | 100 |
|  | $H_2O$ | 7.5 | 7.5 | 7.5 |
|  | Polycat 46 | 0.6 | 0.6 | 0.6 |
|  | Polycat 42 | 1.4 | 1.4 | 1.4 |
|  | Si. as foam stabilizer-4 | 3.0 | 3.0 | 3.0 |
|  | Si. as foam stabilizer-5 | 0 | 0 | 0 |
|  | Ionet DO-600 | 100 | 100 | 100 |
|  | Newcall 271S | 20 | 20 | 20 |
|  | $CaCO_3$ | 10 | 10 | 10 |
|  | Coronate 1110 | 350 | 350 | 350 |
| physical | specific gravity (g/cm$^3$) | 0.019 | 0.018 | 0.019 |
| property | 10% compressive hardness | 0.45 | 0.36 | 0.41 |
|  | 40% compressive hardness | 0.45 | 0.36 | 0.40 |
|  | open-cell ratio (%) | 100 | 100 | 100 |
|  | water absorption speed | rapid | rapid | rapid |
|  | water sinking speed | 38 sec | 60 sec | 36 sec |
|  | $H_2O$ absorption rate V/V | 0.89 | 0.91 | 0.96 |
|  | $H_2O$ holding rate V/V | 0.70 | 0.78 | 0.76 |
|  | Inserting ability (C*) | good | good | good |
|  | inserting ability (P**) | good | good | good |
|  | $H_2O$ hold rate of plant | good | good | good | unit of compressive hardness is (kgf/cm$^2$)
*cross direction
**parallel direction Example 4

Polyisocyanurate foam is prepared by reacting polyetherpolyol (polyol-2) of about 3000 molecular weight which is produced by random addition reaction of ethylene oxide and glycerin by 80/20 weight proportion, crude polymethylene polyphenylene polyisocyanate and neutral emulsifier which does not have an activated hydrogen.

Recipe of starting materials and characteristics of obtained foams are summarized in Table 3.

Example 5

Polyisocyanurate foam is prepared by reacting polyetherpolyol (polyol-7) of about 1000 molecular weight which is produced by random addition reaction of ethylene oxide and glycerin by 80/20 weight proportion, crude polymethylene polyphenylene polyisocyanate and neutral emulsifier which does not have an activated hydrogen and anionic emulsifier.

Recipe of starting materials and characteristics of obtained foams are summarized in Table 3.

TABLE 3

|  | material/experimental No. | Exmp. 4 | Exmp. 5 |
|---|---|---|---|
| recipe | Polyol-2 | 100 | 0 |
|  | Polyol-3 | 0 | 100 |
|  | Polyol-4 | 0 | 0 |
|  | $H_2O$ | 14.0 | 17.5 |
|  | Polycat 46 | 0.8 | 0 |
|  | Polycat 41 | 0 | 2.0 |
|  | Polycat 42 | 1.8 | 0 |
|  | Si. as foam stabilizer-5 | 3.0 | 0 |
|  | Si. as foam stabilizer-6 | 0 | 3.0 |
|  | Ionet DO-600 | 140 | 75 |
|  | Newcall 271S | 0 | 0 |
|  | $CaCO_3$ | 20 | 20 |
|  | Coronate 1110 | 350 | 440 |
| physical | specific gravity (g/cm$^3$) | 0.029 | 0.023 |
| property | 10% compressive hardness | 0.50 |  |
|  | 40% compressive hardness | 0.52 | 0.49 |
|  | open-cell ratio (%) | 100 | 100 |
|  | water absorption speed | 3 sec | 1 sec |
|  | water sinking speed | 60 sec | 40 sec |

TABLE 3-continued

| material/experimental No. | Exmp. 4 | Exmp. 5 |
|---|---|---|
| $H_2O$ absorption rate V/V | 0.94 | 0.95 |
| $H_2O$ holding rate V/V | 0.64 | 0.74 |
| inserting ability (C*) | good | |
| inserting ability (P**) | good | |
| $H_2O$ hold rate of plant | good | |
| seedling growing ability | good | good | unit of compressive hardness is (kgf/cm$^2$)
*cross direction
**parallel direction Silicone as foam stabilizers-4:
Polysiloxane-polyalkylene copolymer, average polymerization degree of dimethyl siloxane is 20 (m of chemical formula [1] is 20), average polymerization degree of polyoxyalkylene graft methylsiloxane is 13 (n of chemical formula [1] is 1.3), oxyethylene in polyoxyalkylene is 75 wt % and others is oxypropylene and oxyethylene end is methoxy group, molecular weight of polyoxyalkylene is about 1600.

Silicone as foam stabilizer-5:
Polysiloxane-polyalkylene copolymer, average polymerization degree of dimethyl siloxane is 30 (m of chemical formula [1] is 30), average polymerization degree of polyoxyalkylene graft methylsiloxane is 10 (n of chemical formula [1] is 1.0), oxyethylene in polyoxyalkylene is 75 wt % and others is oxypropylene and oxyethylene end is methoxy group, molecular weight of polyoxyalkylene is about 1300.

Silicone as foam stabilizer-6:
Polysiloxane-polyalkylene copolymer, average polymerization degree of dimethyl siloxane is 20 (m of chemical formula [1] is 20 and n is 1.0), oxyethylene in polyoxyalkylene is 75 wt % and others is oxypropylene and oxyethylene end is methoxy group, molecular weight of polyoxyalkylene is about 1600.

Newcall 271S:
48% aqueous solution of sodium alkyldiphenylether sulfonate (product of Japan Emulsifier Co., Ltd.).

Sinking time into water:
A specimen of 20 mm×x40 mm×15 mm thickness is floated on pure water and the time the whole surface of specimens is sank into water (not the time when the surface become wet by a capillary phenomenon), or if the specimen does not sink into water, the thickness where the specimen is sank is measured.

Water absorption rate:
A specimen of 2 mm×40 mm×15 mm thickness is floated on water and after whole surface of specimen is sank into water or after 5 minutes if the specimen does not sink into water the specimen is picked up and left for 1 minute on polyethylene film sheet, then the amount of absorbed water is measured. The volume of absorbed water is divided by volume of the specimen.

Water holding rate:
After the measurement of water absorption rate, further the specimen is left for another 24 hours on polyethylene film sheet, then the amount of remained water is measured and 1 g of water is converted to 1 cm$^3$. The volume of remained water is divided by volume of the specimen.

Inserting ability to a cross direction:
A baby's breathe is inserted into a foam to the parallel direction of pore forming direction. The resistance for inserting from the starting to the end is measured. Further, judged by easy inserting using gerbera.

Inserting ability to a parallel direction:
A baby's breathe is inserted into a foam to the cross direction of pore forming direction. The resistance for inserting from the starting to the end is measured. Further, judged by easy inserting using gerbera.

Water holding rate of a plant:
A specimen of 80 mm×100 mm×70 mm thickness is solved into water and allowed to absorb water, then a baby's breathe and gerbera are inserted into the foam and left for 3 days in room temperature without water supply, and the appearance of these flowers is observed.

Seedling growing ability:
Seed of leak is sown on the foam of this invention and after germination, judged by growth of root, growth of plant by a hydroponic cultivation, supporting ability and easy removing of the foam after harvest.

Although not indicated in Table 2 and Table 3, the 40% compressive hardness to the cross direction to a pore forming direction is in the range of plus 5% of the 10% compressive hardness to the cross direction to a pore forming direction.

As clearly understood by Table 2 and Table 3, all five types of foam of this invention disclosed in above mentioned Examples have 100% open-cell proportion and have fast water absorbing time and good water holding rate. Moreover, the plant of slender and weak stalk such as baby's breathe can easily be inserted into the foams, and does not wither after 3 days without water supply.

Comparative Examples 1 and 2

Polyisocyanurate foam is prepared by polyetherpolyol (polyol-2) of about 3000 molecular weight which is produced by random addition reaction of ethylene oxide and propylene oxide to glycerin by 80/20 weight proportion and polymethylene-polyphenylenepolyisocyanate, while neutral emulsifier which does not have an activated hydrogen and anionic emulsifier are not used.

Recipe of starting materials and characteristics of obtained foams are summarized in Table 4.

Comparative Example 3

Polyisocyanurate foam is prepared by polyetherpolyol (polyol-2) of about 3000 molecular weight which is produced by random addition reaction of ethylene oxide and propylene oxide to glycerin by 80/20 weight proportion, polymethylene-polyphenylenepolyisocyanate and anionic emulsifier.

Recipe of starting materials and characteristics of obtained foams are summarized in Table 4.

Comparative Example 4

Polyisocyanurate foam is prepared by polyetherpolyol (polyol-2) of about 3000 molecular weight which is produced by random addition reaction of ethylene oxide to glycerine by 80/20 weight proportion, polymethylenepolyphenylene-polyisocyanate, neutral emulsifier which does not have an activated hydrogen and anionic emulsifer.

Recipe of starting materials and characteristics of obtained foams are summarized in Table 4.

TABLE 4

| | Material/experimental No. | C. Exp. 1 | C. Exp. 2 | C. Exp. 3 | C. Exp. 4 |
|---|---|---|---|---|---|
| recipe | Polyol-2 | 100 | 100 | 100 | 100 |
| | H$_2$O | 6.0 | 9.0 | 4.0 | 9.0 |
| | Polycat 46 | 0.8 | 0.8 | 0.5 | 0.6 |
| | Polycat 42 | 1.8 | 1.8 | 1.3 | 1.4 |
| | Si. as foam stabilizer-5 | 3.0 | 3.0 | 3.0 | 3.0 |
| | Ionet DO-600 | 0 | 0 | 0 | 50 |
| | Newcall 271S | 0 | 0 | 20 | 10 |
| | CaCO$_3$ | 20 | 20 | 20 | 20 |
| | Coronate 1110 | 350 | 350 | 350 | 350 |
| physical property | Specific gravity (g/cm$^3$) | 0.032 | | 0.024 | 0.024 |
| | appearance | defoamed | defoamd | good | good |
| | 10% compressive hardness | 0.89 | | 0.89 | 0.60 |
| | 40% compressive hardness | 0.93 | | 0.91 | 0.68 |
| | open-cell ratio (%) | 68.1 | | 59.6 | 72.2 |
| | water absorption speed | 120 min | | 105 min | 1 sec |
| | water sinking speed | 2 mm sank in 5 min | | 2 mm sank in 5 min | 3 mm sank in 5 min |
| | H$_2$O absorption rate V/V | 0.07 | | 0.05 | 0.10 |
| | H$_2$O holding rate V/V | ≈0 | | 0.03 | 0.03 |
| | inserting ability (C*) | good | | good | good |
| | inserting ability (P**) | good | | good | good |
| | H$_2$O hold rate of plant | not good | | not good | not good |

C. Exp.: Comparative Example
unit of compressive hardness is (kgf/cm$^2$)
*cross direction
**parallel direction In Table 4, the open-cell proportion of foams of Comparative Example 1 and 2 is not so high. In these cases, it is difficult to prepare a foam of open-cell constantly because a neutral emulsifier or others are not used. That is, since the generated independent cell breaks suddenly if at least a neutral emulsifier is not used, the constant preparation of the foam is not possible.

And, in this Comparative Example, polysiloxane-polyoxyalkylene copolymer whose end is capped by methoxy group is used and the water absorption rate is very slow. That is, if a neutral emulsifier or an anionic emulsifier are not used, the stable preparation of high open-cell proportion and quicker water absorption speed foam is very difficult.

Further, as obvious from Comparative Example 3, the preparation of high open-cell proportion and quicker water absorption speed foam is difficult without a neutral emulsifier even if an anionic emulsifier is used.

The open-cell proportion of the foam of Comparative Example 4 is low, however, the water absorption speed of it is very high. This foam has lower open-cell proportion, which is caused by lack of amount of use of a neutral emulsifier which does not have an activated hydrogen and an anionic emulsifier.

Thus, for the preparation of high open-cell proportion and quicker water absorption speed foam, it is necessary to use polyol of high oxyethylene rate, polysiloxane-polyoxyalkylene copolymer whose end is capped by methoxy group and neutral emulsifier. Further, the water absorption and water holding ability can be improved by the use of an ionic emulsifier together with the other ingredients.

As described below, polyisocyanurate foams are produced using the recipes shown in Tables 5 and 6.

Examples 6 to 11

Results of Example 6 and 11 are summarized in Tables 5 and 6.

TABLE 5

| | material/experimental No. | Exmp. 6 | Exmp. 7 | Exmp. 8 |
|---|---|---|---|---|
| recipe | Polyol-2 | 30 | 90 | 0 |
| | Polyol-5 | 70 | 10 | 0 |
| | Polyol-6 | 0 | 0 | 100 |
| | H$_2$O | 17.5 | 11.5 | 11.5 |
| | Polycat 41 | 3.0 | 2.5 | 2.5 |
| | Si. as foam stabilizer-7 | 3.0 | 0 | 0 |
| | Si. as foam stabilizer-8 | 0 | 6.0 | 0 |
| | Si. as foam stabilizer-9 | 0 | 0 | 6.0 |
| | Ionet DO-600 | 100 | 0 | 0 |
| | Ionet DO-400 | 0 | 0 | 120 |
| | Neutral emulsifier-1 | 0 | 90 | 0 |
| | Newcall 271S | 0 | 10 | 10 |
| | CaCO$_3$ | 20 | 20 | 20 |
| | Irganox 1010 | 1.0 | 1.0 | 1.0 |
| | Papi-135 | 400 | 400 | 400 |
| physical property | specific gravity (g/cm$^3$) | 0.021 | 0.020 | 0.021 |
| | 10% compressive hardness | 0.20 | 0.52 | 0.35 |
| | 40% compressive hardness | 0.20 | 0.54 | 0.37 |
| | open-cell ratio (%) | 100 | 100 | 100 |
| | water absorption speed | 50 sec | rapid | 3 sec |
| | water sinking speed | 3 min 45 sec | 13 sec | 59 sec |
| | H$_2$O absorption rate V/V | 0.94 | 0.98 | 0.95 |
| | H$_2$O holding rate V/V | 0.75 | 0.80 | 0.76 |
| | inserting ability (C*) | good | good | good |
| | inserting ability (P**) | good | good | good |
| | H$_2$O hold rate of plant | good | good | good | unit of compressive hardness is (kgf/cm$^3$)
*cross direction
**parallel direction

TABLE 6

| material/experimental No. | | Exmp. 9 | Exmp. 10 | Exmp. 11 |
|---|---|---|---|---|
| recipe | Polyol-2 | 90 | 100 | 0 |
| | Polyol-5 | 10 | 0 | 0 |
| | Polyol-7 | 0 | 0 | 100 |
| | $H_2O$ | 11.5 | 11.5 | 11.5 |
| | Polycat 41 | 2.5 | 2.5 | 2.0 |
| | Si. as foam stabilizer-10 | 6.0 | 0 | 0 |
| | Si. as foam stabilizer-11 | 0 | 6.0 | 0 |
| | Si. as foam stabilizer-12 | 0 | 0 | 6.0 |
| | Neutral emulsifler-2 | 90 | 0 | 0 |
| | Leo fat-110M | 0 | 110 | 0 |
| | Ionet DO-600 | 0 | 0 | 100 |
| | Newcall 271S | 10 | 10 | 10 |
| | $CaCO_3$ | 20 | 20 | 20 |
| | Irganox 1010 | 1.0 | 1.0 | 1.0 |
| | Papi-135 | 400 | 400 | 400 |
| physical property | specific gravity (g/cm$^3$) | 0.025 | 0.021 | 0.021 |
| | 10% compressive hardness | 0.48 | 0.54 | 0.59 |
| | 40% compressive hardness | 0.49 | 0.57 | 0.60 |
| | open-cell ratio (%) | 100 | 100 | 100 |
| | water absorption speed | rapid | 1 sec | 4 sec |
| | water sinking speed | 23 sec | 32 sec | 40 sec |
| | $H_2O$ absorption rate V/V | 0.99 | 0.94 | 0.97 |
| | $H_2O$ holding rate V/V | 0.82 | 0.79 | 0.76 |
| | inserting ability (C*) | good | good | good |
| | inserting ability (P**) | good | good | good |
| | $H_2O$ hold rate of plant | good | good | good | unit of compressive hardness is (kgf/cm$^2$)
*cross direction
**parallel direction Silicone as foam stabilizer-7:
Polysiloxane-polyalkylene copolymer, in chemical formula [1], m is 20 and n is 1, oxyethylene in polyoxyalkylene is 80 wt % and others is oxypropylene, and oxyalkylene end is methoxy group, molecular weight of polyoxyalkylene is 1300.

Silicone as foam stabilizer-8:
Polysiloxane-polyalkylene copolymer, in chemical formula [1], m is 20 and n is 1, oxyethylene in polyoxyalkylene is 80 wt % and others is oxypropylene, and oxyalkylene end is methoxy group, molecular weight of polyoxyalkylene is 1350.

Silicone as foam stabilizer-9:
Polysiloxane-polyalkylene copolymer, in chemical formula [1], m is 20 and n is 1, oxyethylene in polyoxyalkylene is 60 wt % and others is oxypropylene, and oxalkylene end is methoxy group.

Silicone as foam stabilizer-10:
Polysiloxane-polyalkylene copolymer, in chemical formula [1], m is 30 and n is 4, oxyethylene in polyoxyalkylene is 80 wt % and others is oxypropylene, and oxyalkylene end is methoxy group, molecular weight of polyoxyalkylene is 1000.

Silicone as foam stabilizer-12:
Polysiloxane-polyalkylene copolymer, in chemical formula [1], m is 30 and n is 4, oxyethylene in polyoxyalkylene is 80 wt % and others is oxypropylene, and oxyalkylene end is methoxy group, molecular weight of polyoxyalkylene is 800.

Neutral emulsifier-1:
Both ends of polyethylene glycol of molecular weight 600 are esterified by lauric acid.

Neutral emulsifer-2:
Both ends of polyoxyethylenepropylenediol composed by 80 wt % of ethylene oxide and 20 wt % of propylene oxide of molecular weight 800 are esterified by oleic acid.

Leofat- 110M:
Product of Lion Co., Ltd. stearic acid methyl ethyl ester to which ethylene oxide is added.

Ionet Do-400:
Neutral emulsifier, oleic acid diester of polyethylene glycol (product of Sanyo Kasei Industries Co., Ltd.).

Irganox 1010:
Product of Gaigy Co., Ltd. Antioxidation agent.

Papi-135:
Product of Dow. Polyurethane Japan Co., Ltd.

Example 6

Polyisocyanurate foam is prepared by reacting polyetherpolyol (polyol-2) of about 3000 molecular weight which is produced by random addition reaction of ethylene oxide and propylene oxide to glycerin by 80/20 weight proportion, polyetherpolyol (polyol-5) of propylene oxide of about 3000, crude polymethylene polyphenylene polyisocyanate and neutral emulsifier which does not have an activated hydrogen.

Recipe of starting materials and characteristics of obtained foams are summarized in Table 5.

Example 7

Polyisocyanurate foam is prepared by reacting polyetherpolyol (polyol-2) of about 3000 molecular weight which is produced by random additional reaction f ethylene oxide and propylene oxide to glycerin by 80/20 weight proportion, polyetherpolyol (polyol-5) of propylene oxide of about 3000, crude polymethylene polyphenylene polyisocyanate, a neutral emulsifier which does not have an activated hydrogen and an anionic emulsifier.

Recipe of starting materials and characteristics of obtained foams are summarized in Table 5.

Example 8

Polyisocyanurate foam is prepared by reacting polyethertriol (polyol-6) of about 2500 molecular weight which is produced by random addition reaction of ethylene oxide and propylene oxide to glycerin by 50/50 weight proportion, crude polymethylene polyphenylene polyisocyanate, a neutral emulsifier which does not have an activated hydrogen and an anionic emulsifier.

Recipe of starting materials and characteristics of obtained foams are summarized in Table 5.

Example 9

Polyisocyanurate foam is prepared by reacting polyetherpolyol (polyol-2) of about 3000 molecular weight which is produced by random addition reaction of ethylene oxide and propylene oxide to glycerin by 80/20 weight proportion, polyetherpolyol (polyol-5) of propylene oxide of about 3000, crude polymethylene polyphenylene polyisocyanate, a neutral emulsifier which does not have an activated hydrogen and an anionic emulsifier.

Recipe of starting materials and characteristics of obtained foams are summarized in Table 6.

Example 10

Polyisocyanurate foam is prepared by reacting polyetherpolyol (polyol-2) of about 3000 molecular weight which is produced by random addition reaction of ethylene oxide and propylene oxide to glycerin by 80/20 weight proportion, crude polymethylene polyphenylene polyisocyanate, a neutral emulsifier which does not have an activated hydrogen and an anionic emulsifier.

Recipe of starting materials and characteristics of obtained foams are summarized in Table 6.

Possibility for the Industrial Use

The conventional hard type polyurethane foam used as the supporter for fixing and supporting a plant is usually prepared using more than two kinds of polyol whose reactivity are different and in lower isocyanate index, to provide open-cell and water absorbing ability. Consequently, the obtained foam retains elasticity which affect the inserting property for a cut flower, further said foam lacks water absorbing capacity and water holding ability caused by insufficient open-cell, and the market of the supporter for fixing and supporting a plant is occupied by a phenol foam.

Meanwhile, since the phenol foam is prepared using fulon type pore forming agent and using formalin as a reacting agent, it has a possibility to cause a serious environmental problem for atmosphere.

By the present invention, it becomes possible to prepare a foam by $H_2O$ pore forming agent alone without using a fulon type or an organic solvent type pore forming agent, therefore, the hard type polyurethane foam which has an excellent inserting property and water holding ability can be provided.

What is claimed is:

1. A hard type polyisocyanurate foam having open-cell, useful as a supporter to fix and support a plant, said foam being prepared using a polyisocyanate compound, a hydroxy compound, a pore forming agent comprising water, pentane, hexane, dichloromethane, 1, -dichloro-1-fluoroethane, or mixture of any of the foregoing or other low boiling point liquid pore forming agent, a catalyst, a silicone foam stabilizer, a neutral emulsifier which does not have an activated hydrogen and, optionally, an ionized emulsifier, as starting materials, wherein, the polyisocyanate compound is an aromatic polyisocyanate compound, the hydroxy compound is a hydroxy compound whose average number of functional groups is bigger than 1.0 and content of oxyethylene is bigger than 20% by weight, the catalyst is at least an isocyanurate catalyst and the silicone as foam stabilizer is a polysiloxane-polyoxyalkylene copolymer whose polyoxyalkylene polyether end OH group is capped by a compound which does not include activated hydrogen atom, further, said polyoxyalkylene contains more than 30 weight % of oxyethylene, and is used at the pore formation process, further said foam having the following structural features:

8 to 70 kg/m³ specific gravity;
higher than 98% open-cell ratio and
a 40% compressive hardness to the parallel direction to the pore forming direction in the range of 0.1 to 2.0 kgf/cm².

2. The hard type polyisocyanurate foam according to claim 1, further characterized by having 10 to 40% compressive hardness parallel and cross to the foam rising direction in the range of 0.2 to 1.5 kgf/cm², and a 40% compressive hardness in the range of from minus 20% to plus 20% of the 10% compressive hardness.

3. The hard type polyisocyanurate foam according to claim 1, wherein the polyisocyanate compound is polymethylenepolyphenyleneisocyanate, 4,4'diphenylmethanediisocyanate, crude polymethylenepolyphenylenepolyisocyanate or modified polyisocyanate of polymethylenepolyphenylenepolyisocyante.

4. The hard type polyisocyanurate foam according to claim 1, wherein the neutral emulsifier comprises a polyoxyalkylene polyether end OH group which is capped by a compound which does not include an activated hydrogen.

5. The hard type polyisocyanurate foam according to claim 1, wherein the polyoxyalkylene polyether end of the polysiloxane-polyoxyalkylene copolymer is capped with at least one member selected from the group consisting of an alkoxy group of carbon number 1 to 4, an aliphatic acyloxy group and an acetoxy group.

6. The hard type polyisocyanurate foam according to claim 1 or claim 4, wherein the neutral emulsifier is an esterficated compound of polyoxyalkylenepolyol by oleic acid, stearic acid, linolenic acid, linoleic acid, stearol acid or lauric acid.

7. The hard type polyisocyanurate foam according to claim 1 or claim 4, wherein the neutral emulsifier is an esterficated compound of polyoxyalkylenepolyol by oleic acid, stearic acid, linolenic acid, stearol acid or lauric acid.

8. The hard type polyisocyanurate foam according to any one of claim 1, claim 4 and claim 6, wherein the amount of neutral emulsifier which does not have an activated hydrogen is in the region of 20 to 200 parts by weight to 100 parts of polyoxyalkylenepolyol whose proportion of ethyleneoxide is bigger than 20.

9. The hard type polyisocyanurate foam according to claim 1, wherein the hydroxy compound comprises addition polymer of an alkylene oxide to methanol, ethanol, propanol, ethylene glycol, propylene glycol, diethylene glycol, stearyl alcohol, oleyl alcohol, cetyl alcohol, allyl alcohol, glycerin, trimnethylolpropane, pentaerythritol, sorbitol, monoethanolamine, diethanolamnine, triethanolamine, ethylenediamine, tolylenediamine, oleic acid, stearic acid or alkylphenol.

10. The hard type polyisocyanurate foam according to claim 1, wherein the hydroxy compound has from 1.0 to 3.5 functional groups, on average, and further has a number average molecular weight of from 500 to 10,000 and an oxyethylene content of from 50 to 90% by weight.

11. The hard type polyisocyanurate foam according to claim 1, wherein the isocyanurate catalyst has an isocyanate index greater than 110.

12. The hard type polyisocyanurate foam according to claim 1, wherein the neutral emulsifier has an oxyethylene content of at least 50 percent by weight, based on the total molecular weight of the neutral emulsifier.

13. The hard type polyisocyanurate foam according to claim 1 or claim 12, wherein the neutral emulsifier is selected from the group consisting of diester of polyethyleneglycol linoleic acid, diester of polyethylene glycol linoeic acid, diester of polyethylene glycol triallol acid, ethyleneoxide adduct of glycerin oleic acid triester, polyethyleneglycol oleic lauric acid diester, polyethyleneglycol stearic acid diester, polyethyleneglycol lauric acid diester, polyethyleneglycol oleic acid diester, dimethylpolyethylene glycol, polyethylenepolypropyleneglycol stearic acid diester, and dimethylpolyethylenepolypropyleneglycol.

14. The hard type polyisocyanurate foam according to claim 1, which comprises from about 2 to about 35 wt. percent of the neutral emulsifier based on the starting materials.

15. The hard type polyisocyanurate foam according to claim 1, wherein the polysiloxane-polyalkylene copolymer has its polyalkylene polyether end group capped by $C_1$–$C_4$ alkoxy, acetoxy or aliphatic acyloxy.

16. The hard type polyisocyanurate foam according to claim 1, wherein the polysiloxane-polyoxyalkylene copolymer is represented by the formula

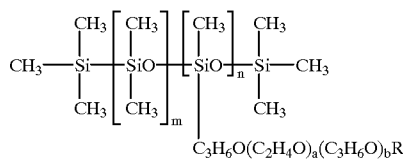

$C_3H_6O(C_2H_4O)_a(C_3H_6O)_bR$

17. The hard type polyisocyanurate foam according to claim 16, wherein in said formula, the ratio n/m is in the range of from about 1/5 to about 1/60.

18. The hard type polyisocyanurate foam according to claim 1, claim 15, or claim 16, wherein the proportion of oxyethylene in said copolymer to the total weight of the polyoxyalkylene in said copolymer is from about 50 wt. % to about 90 wt. %.

19. The hard type polyisocyanurate foam according to claim 1, claim 15, or claim 16, wherein the proportion of oxyethylene in said copolymer to the total weight of the polyoxyalkylene in said copolymer is from about 70 wt. % to about 90 wt. %.

20. The hard type polyisocyanurate foam according to claim 1, wherein the foam has a specific gravity of from about 13 to 70 kg/m$^3$.

21. The hard type polyisocyanurate foam according to claim 1, wherein the foam has a specific gravity of from about 18 to 35 kg/m$^3$.

22. The hard type polyisocyanurate foam according to claim 1, wherein the polyisocyanate compound is crude polymethylenephenylene polyisocyanate.

23. A method for supporting and fixing a plant for growth or transportation, which comprises inserting a plant or plant seed in the hard type polyisocyanurate open-cell foam according to claim 1, and before or after said step of inserting, contacting the foam with water and allowing the water to be absorbed by said foam.

24. The method of claim 23, wherein said plant or plant seed comprises a plant bud.

25. The method of claim 23, wherein said plant or plant seed comprises a tree.

26. The method of claim 23, wherein said plant or plant seed comprises a cut flower.

27. The method of claim 26, wherein said cut flower comprises baby's breathe.

28. The method of claim 26, wherein said cut flower comprises gerbera.

29. The hard type polyisocyanurate foam according to claim 1, wherein the pore forming agent comprises water.

30. The hard type polyisocyanurate foam according to claim 1, wherein the pore forming agent comprises pentane, hexane, dichloromethane, or 1,1-dichloro-1-fluoroethane.

31. The hard type polyisocyanurate foam according to claim 1, wherein the pore forming agent comprises water and at least one of pentane, hexane, dichloromethane, or 1,1-dichloro-1-fluoroethane.

* * * * *